3,301,766
FERMENTATION PROCESS FOR PREPARING CINNAMIC ACID AND 5-PHENYL VALERIC ACID
John D. Douros, Jr., Millington, and John W. Frankenfeld, Atlantic Highlands, N.J., assignors to Esso Research and Engineering Company, a corporation of Delaware
No Drawing. Filed Sept. 23, 1964, Ser. No. 398,737
15 Claims. (Cl. 195—28)

This invention is directed to the preparation of cinnamic acid selectively, 5-phenyl valeric acid selectively, and the simultaneous preparation of cinnamic acid and 5-phenyl valeric acid from n-alkylated benzenes containing an odd number of carbon atoms in the n-alkyl moiety, i.e., side chain of the n-alkylated benzenes and mixtures thereof. Usually the n-alkylated benzene is monocyclic and contains in its n-alkyl side chain an odd number of carbon atoms ranging from 3 to 15 carbon atoms and mixtures of said alkylated benzenes. Preferably, however, the n-alkylated benzene compounds (or mixtures of these compounds) contain an odd number of carbon atoms ranging from 3 to 9 carbon atoms as quicker conversions are thereby secured.

The process of this invention is conducted by first fermenting any one of six certain microorganisms (discussed in detail hereinafter) on another carbon source (i.e. a carbon feed source other than the n-alkylated benzenes described above) in a growth medium containing water, available oxygen, and other essential nutrients for said microorganisms; thereafter feeding an n-alkylated benzene (or mixture thereof) containing an odd number of carbon atoms in the n-alkyl side chain which n-alkylated benzenes (or mixture thereof) are then converted to 5-phenyl valeric acid and cinnamic acid.

The first stage of fermentation, viz., prior to addition of the n-alkylated benzene(s), is conducted in generally the same manner regardless of whether the ultimate objective is the selective preparation of cinnamic acid or 5-phenyl valeric acid. Usually both of said acids are present in varying amounts at all harvesting stages after addition of said n-alkylated benzenes. The first stage of fermentation is conducted for from about 18 to about 56 hours after which the n-alkylated benzene compound (or mixtures thereof) containing an odd number of carbon atoms is added to the fermentation medium in varying concentrations ranging from about 0.5 to about 20.0 wt. percent (based on total fermentation media) and fermentation is continued.

The main key to controlling the selectivity of the process resides in the harvesting time(s) at which the desired acid is removed from the reaction medium in conjunction with the growth level of microorganism cells present when said n-alkylated benzene is added (esp. when preparing cinnamic acid selectively).

To secure cinnamic acid in high selectivity the second stage of fermentation, viz. after the addition of the n-alkylated benzene(s), is continued for from about 20 to about 144 hours before harvesting the product acids and microorganism cells. Using this procedure, cinnamic acid can be obtained in selectivities up to and even exceeding 95 percent (molar basis based on total acid production) with a small amount of 5-phenyl valeric acid, e.g. generally not substantially in excess of 5 percent (on a comparable basis) being present.

To secure 5-phenyl valeric acid selectively the second stage of fermentation is conducted for a period of up to about 18 hours, e.g. 2 to about 18 hours, after addition of the n-alkylated benzene. Actually the 5-phenyl valeric acid can be harvested selectively from shortly after the addition of the n-alkylated benzene up to about 18 hours thereafter, and in a continuous process the 5-phenyl valeric acid is preferably removed continuously as formed.

The six microorganisms whose use is contemplated in accordance with this invention are tabulated hereinbelow along with their corresponding A.T.C.C. registration numbers, which were secured by depositing samples with the American Type Culture Collection in Washington, D.C.

| Microorganism name: | A.T.C.C. Number |
|---|---|
| Pseudomonas ligustri | 15522 |
| Pseudomonas pseudomallei | 15523 |
| Pseudomonas orvilla | 15524 |
| Alcaligenes sp. | 15525 |
| Cellumonas galba | 15526 |
| Brevibacterium healii | 15527 |

The bacteriological characteristics of these microorganisms as determined by the below indicated tests leading to the above nomenclature are as follows:

NOMENCLATURE TESTS

| Tests, A.T.C.C. No. | 15522 | 15523 | 15524 | 15525 | 15526 | 15527 |
|---|---|---|---|---|---|---|
| Morphology | Small gram negative rod. | Small, thin gram negative rod. | Small, thin gram negative rod. | Small gram negative rod. | Small, thin gram positive rod. | Large gram positive rod. |
| Motility | +(motile) | + | + | −(immotile) | + | +. |
| Gram Reaction | −(negative) | − | − | − | +(positive) | +. |
| Agar Colony Morphology | Opalescent, filamentous, radiated surface, ridged, rhizoid. | Raised entire edge, rough surface, glistening, butyrous. | Raised, rough, circular, undulate, opaque, viscid. | Rough, circular, sl. elevated edge undulate, opaque, membranous. | Lobate, flat, smooth opaque, membranous. | Raised, smooth entire edge, opaque, dull, butyrous. |
| Carbohydrate Fermentation | +On starch and glucose. | +On glucose only. | +On glucose only. | +On glucose, −on starch, lactose, sucrose, mannitol. | −On glucose, lactose, sucrose, starch and mannitol. | +On glucose and lactose, −on sucrose, starch and mannitol. |
| Pigmentation | Green on tryptose, brown on nutrient agar, white on potato, echinulate. | White on potato, nutrient agar, and tryptose, on dextrose (produces green pigment). | White on all media filiform. | White on potato, green on tryptose. | White on nutrient agar, yellow on tryptone, white on potato. | White on all and echinulate. |
| Gelatin Liquefaction | + | + | − | − | + | −. |
| Growth Temperature (° C.) | 30° (37°, 42°) | 30° (37°, 42°) | 30° (37°) | 30° (37°) | 30° | 30° (not at 37°). |
| Urea Hydrolysis | − | + | − | + | +(at 48 hours) | +. |
| Sulfide Production | − | − | − | − | − | −. |
| Catalase Production | + | + | − | + | + | −. |
| Nitrate Reduction | − | − | − | − | − | +. |
| Oxygen | Aerobe | Aerobe | Aerobe | Aerobe | Aerobe | Aerobe. |
| Source | Soil | Soil | Soil | Soil | Soil | Soil. |
| Habitat | Soil-hydrocarbons | Soil-hydrocarbons | Soil-hydrocarbons | Soil-hydrocarbons | Soil-hydrocarbons | Soil-hydrocarbons. |

As mentioned above according to one of the preferred embodiments of this invention the acid compounds to be made, viz., cinnamic acid and 5-phenyl valeric acid, can be prepared in high conversion based on the n-alkylated benzene fed. For example, conversions to cinnamic acid, 5-phenyl valeric acid, and chemicals amounting to essentially 100% (on a weight basis) can be achieved using preferred microorganisms, n-alkylated benzene compounds and optimum first and second stage fermentation reaction periods. As noted above, selectivities to cinnamic acid and 5-phenyl valeric acid, respectively, are secured by controlling the feed in time of the n-alkylated benzene compound and controlling the harvest time to the desired organic acid.

An ancillary benefit attained by the present invention is the production of microorganism cells via fermentation, which cells can be used as protein-containing feed supplements for animals, protein glues (when protein is extracted from the raw cells), etc. What apparently happens, when the process of this invention is conducted, is that the microorganisms feed on the "other carbon source" and then convert the n-alkylated benzene compounds (mentioned above), into cinnamic acid and 5-phenyl valeric acid selectively. Thus in the second stage of fermentation the above-mentioned microorganisms act like chemical reactors in that they take the n-alkylated benzene compound and produce cinnamic acid and 5-phenyl valeric acid from it. A surprising facet of this process is that said microorganisms do not apparently employ the n-alkylated benzene compound(s) as food, and in any event certainly not as a primary food source. In theorizing on this behavior, it is possible to denominate this action as a selective cooxidative biosynthesis with each of said microorganisms feeding on the "other carbon source," e.g., n-paraffins, olefins, etc., and converting the odd number n-alkylated benzenes to cinnamic acid and 5-phenyl valeric acid. Of course, the present invention is not necessarily dependent for its successful operation upon this or any other theory the fact remaining that these advantages are secured regardless of the theory involved.

While, as noted above, each of said microorganisms produces cinnamic acid and 5-phenyl valeric acid; some produce cinnamic acid better than they do 5-phenyl valeric acid, and vice versa. Excellent cinnamic acid producers are Pseudomonas sp. closely related to Pseudomallei (A.T.C.C. No. 15523) and Cellulomonas sp. closely related to *galba* (A.T.C.C. No. 15526) with the latter being the better of the two. In like manner Alcaligenes sp. (A.T.C.C. No. 15525) is the best 5-phenyl valeric acid producer of these six microorganisms.

The n-alkylated benzene compound(s) fed at the second stage of fermentation to produce cinnamic acid and 5-phenyl valeric acid can be any monocyclic aromatic compound having an n-alkyl substituent where the n-alkyl substituent has an odd number of carbon atoms. Usually n-alkylated benzenes are employed having from 3 to 15 carbon atoms with the proviso that said n-alkyl portion has an odd number of carbon atoms. $C_3$–$C_9$ odd alkyl moiety carbon numbered n-alkylated benzenes are preferred due to ability of said microorganisms to produce said acids more quickly and more readily from these reactants. Exemplary $C_3$–$C_{15}$ odd alkyl moiety carbon numbered n-alkylated benzenes which can be used in accordance with this invention are: n-propyl benzene, n-amyl benzene, n-heptyl benzene, n-nonyl benzene, n-undecyl benzene, n-tridecyl benzene and n-pentadecyl benzene. Mixtures containing any two or more of the above mentioned odd alkyl moiety carbon numbered n-alkylated benzenes can be used in place of a single compound and the net qualitative reaction products are the same, viz. cinnamic acid plus 5-phenyl valeric acid. In producing cinnamic acid and 5-phenyl valeric acid by biosynthesis, the n-alkylated benzenes used have one alkyl substituent. The most preferred $C_3$–$C_9$ odd alkyl moiety carbon numbered n-alkylated benzene is n-amyl benzene due to the ability of said microorganisms to produce cinnamic and 5-phenyl valeric acid therefrom in good purity in reasonably short reaction times and in reasonably good conversions thus contributing to over-all process efficiency.

As mentioned above, the first phase of fermentation is conducted using another carbon source, viz. one other than n-alkylated benzenes. While in general any organic substance containing a combined source of carbon and hydrogen other than n-alkylated benzenes can be used, e.g., other hydrocarbons (paraffins, olefins, aromatics, crude or refined petroleum stocks, e.g. gas oils); carbohydrates; fatty acids; vitamins; proteins; etc., can be employed for microorganism growth; the use of aliphatic hydrocarbons as the carbon source is usually preferred. Normal paraffins are especially preferred since the above microorganisms make a more efficient utilization of the available carbon in these n-paraffinic feedstocks.

Suitable organic materials containing both carbon and hydrogen which can be used as a carbon source for said microorganism growth in accordance with this invention include, but are not limited to, the following: $C_1$–$C_{30}$ normal and branched aliphatic hydrocarbons including both paraffins and mono and polyolefinically unsaturated compounds, mixtures of these $C_1$–$C_{30}$ aliphatic hydrocarbons, etc., e.g. $C_6$–$C_{10}$ light naphthas (viz., low boiling hydrocarbon oils of the $C_nH_{2n}+2$ series and having a boiling point between about 95 and 110° C., and petroleum fractions containing them); $C_{11}$–$C_{30}$ gas oils boiling in the range of about 190–320° C., and petroleum fractions containing them; $C_{11}$–$C_{30}$ normal monoolefins, and petroleum fractions containing them; carbohydrates, e.g., sugars and starches, such as black strap molasses, beet sugar, cane sugar, glucose, fructose, mannose, aliphatic polyols, glycerol and in general $C_2$–$C_{30}$ polyhydric alcohols; saturated and unsaturated lower and higher fatty acids, e.g. $C_4$–$C_{30}$ fatty acids including $C_{10}$–$C_{24}$ mono and polyunsaturated fatty acids; etc.

The preferred n-paraffin feeds for the microorganisms whose use is contemplated herein are the $C_1$–$C_{30}$ n-paraffins, e.g., n-butane, n-decane, n-dodecane, n-hexadecane, n-eicosane, etc., with n-hexadecane being the most preferred $C_1$–$C_{30}$ n-paraffin. Each of the above hydrocarbon feeds can contain n-olefins in varying amounts, e.g., from 0.05 to about 10.0 wt. percent of $C_{11}$–$C_{30}$ n-olefins based on total carbon source present during fermentation (exclusive of n-alkylated benzenes).

Oxygen can be supplied to the cultivation medium in any form capable of being assimilated readily by the said inoculant microorganism, and oxygen-containing compounds can be used as long as they do not adversely affect microorganism cell growth or conversion of amylbenzene to either cinnamic acid or 5-phenyl valeric acid. Conveniently, however, the oxygen is supplied as an oxygen-containing gas, e.g., air, which contains from about 19–22 wt. percent oxygen. While it is preferable to employ air, oxygen-enriched air having more than about 22 wt. percent oxygen can be used.

Nitrogen is essential to biosynthesis and hence must be supplied in the fermentation medium. The source of nitrogen can be any organic or inorganic nitrogen-containing compound which is capable of providing nitrogen in a form suitable for metabolic utilization and assimilation by the six above-mentioned microorganisms. In the organic category, the following compounds can be listed as exemplary nitrogen containing compounds which can be employed in accordance with this invention: proteins, acid-hydrolyzed proteins, enzyme-digested proteins, amino acids, yeast extract, asparagine, urea, etc. However, inorganic nitrogen compounds can be used, such as: ammonium phosphate, ammonium sulphate, ammonium citrate, ammonia, ammonium hydroxide (or various inorganic salts thereof), etc. A very convenient and satisfactory method of supplying nitrogen (and phosphate ion) is to add either ammonium phosphate or ammonium acid phosphate.

In addition to the energy and nitrogen sources, it is necessary to supply requisite amounts of mineral nutrients in the feed medium in order to insure proper microorganism growth and selective production of chemicals. Thus, potassium, iron, and phosphorous are required. These necessary materials can be supplied in the form of their salts, and preferably their water-soluble salts. For example, the potassium can be supplied as potassium chloride, phosphate, sulfate, citrate, acetate, nitrate, etc. Iron and phosphorous are usually supplied in the form of their sulfates and phosphates, respectively, such as corresponding metal or ammonium sulfates and phosphates. When either ammonium phosphate or ammonium acid phosphate is used, it can serve as a combined source of both nitrogen and phosphorous (phosphate ion) for cell growth.

The temperature of the culture during both stages of fermentation can be varied from about 20 to 40° C. Usually temperatures of about 28 to 32° C. are employed. The temperature levels throughout fermentation are maintained within the above temperatures in order to provide optimum combined cell growth and selective chemicals production.

In addition to the energy, nitrogen and phosphorous nutrients referred to hereinabove, other inorganic nutrients which are water-soluble are provided in varying concentrations to maintain maximum cell growth and chemical production. Generally the compositional content of the fermentation growth media at the outset of fermentation is as follows.

| Component | Concentration (Weight Percent Based on Total Media) | | |
| --- | --- | --- | --- |
| | Can Use | Usually Use | Preferably Use |
| Carbon source[1] | 1–12 | 1–8 | 1–4 |
| $K_2HPO_4$ | 0.2–0.6 | 0.4–0.55 | 0.5 |
| $(NH_4)_2HPO_4$ | 0.5–1.5 | 0.8–1.2 | 1.0 |
| $Na_2SO_4$ | 0.001–0.1 | 0.002–0.08 | 0.05 |
| $MgSO_4 \cdot 7\ H_2O$ | 0.01–0.08 | 0.02–0.06 | 0.04 |
| $FeSO_4 \cdot 7\ H_2O$ | 0.0005–0.003 | 0.001–0.0025 | 0.002 |
| $MnSO_4 \cdot 4\ H_2O$ | 0.0005–0.003 | 0.001–0.0025 | 0.002 |
| NaCl | 0.0005–0.003 | 0.001–0.0025 | 0.002 |
| Water | Remainder to equal 100 weight percent | | |

[1] E.g. $C_{11}$–$C_{30}$ n-aliphatic hydrocarbon.

The growth medium is then inoculated with one of the above six microorganisms (usually previously cultured in a small portion of the above media to insure an adequate supply of inoculant microorganisms). The microorganisms chosen for use in any given fermentation can be provided in widely varying amounts at the outset of the fermentation process as long as sufficient microorganisms are initially provided to insure growth and population of the fermentation media. Thus, the initial concentration of the chosen microorganism can range from 0.01 to 20.0 grams per liter of total fermentation media at the outset of fermentation. Cultivation of the inoculum is conducted in a medium as described above after regulation of the media pH generally within the range of 8.0 to 5.9 (depending upon the specific microorganism used). The pH is adjusted from time to time as required to maintain an optimum growth pH range for the specific microorganism being cultivated.

After conducting the initial fermentation for an induction period ranging from about 18 to 56 hours, usually about 18 to 48 hours, the odd alkyl moiety carbon numbered n-alkylated benzene compound (or mixture thereof) is fed in varying amounts to the induced fermentation media. Usually at the time of addition of the said n-alkylated benzene(s) the microorganism cell growth concentration ranges from 0.6 to 20.0 grams per liter (based on total fermentation media including cells) and preferably from about 2.0 to 15.0 grams per liter. It is important when producing primarily cinnamic acid that the cell growth level be between about 3.0 and 15.0 grams per liter before adding the said n-alkylated benzene compound(s) in order to reduce the length of time required for the second stage of fermentation, i.e., reduce the time period between addition of said n-alkylated benzene(s) and harvest of cinnamic acid. Moreover, experimental studies indicate that when cell growth levels of about 6 to 12.5 grams per liter are secured before adding the said n-alkylated benzene(s), the yield and purity of cinnamic acid produced as well as the concentration of cinnamic acid present in the fermentation media are improved thus allowing the use of fairly short second phase fermentation periods, e.g. 20 to 72 hours, and the lower n-alkylated benzene concentrations.

The said n-alkylated benzene compound (or mixture thereof) is added in varying concentrations which range from about 0.1 to 25 grams per liter of total fermentation media (including microorganism cells). Usually the odd alkyl moiety carbon numbered n-alkylated benzene is added to achieve concentrations ranging from 2 to 20 grams per liter of fermentation media, and preferably concentrations of said n-alkylated benzenes of from 3 to 10 grams per liter are maintained especially when conducting continuous cinnamic acid production over extended time periods in a given biosynthesis campaign. The said n-alkylated benzene(s) can be added periodically and gradually throughout the second phase of fermentation or the entire amount of the said n-alkylated benzene(s) can be added at one time. The periodic gradual addition technique is usually preferred, esp., in continuous processing. In accomplishing periodic, gradual addition of the said n-alkylated benzene compound (or mixture thereof) the total amount of the said n-alkylated benzene to be added can be added periodically at equally spaced time periods so that the said n-alkylated benzene concentration ranges set forth above are observed.

Of extreme importance in this invention is the growth of the said microorganisms first on the other carbon source before feeding the said n-alkylated benzenes or mixtures thereof. If said n-alkylated benzenes are fed to said microorganisms without the other carbon source, essentially no cinnamic acid or 5-phenyl valeric acid is obtained.

The following examples are given to illustrate the invention, but should not be construed as limiting the scope thereof.

*Example 1*

A growth medium of the following composition was prepared:

| Component: | Concentration (wt. percent) |
| --- | --- |
| n-Hexadecane | 2.0 |
| $K_2HPO_4$ | 0.5 |
| $(NH_4)_2HPO_4$ | 1.0 |
| $Na_2SO_4$ | 0.05 |
| $MgSO_4 \cdot 7\ H_2O$ | 0.04 |
| $Fe \cdot SO_4 7\ H_2O$ | 0.002 |
| $MnSO_4 \cdot 4\ H_2O$ | 0.002 |
| NaCl | 0.002 |
| Tap water | ([1]) |

[1] Remainder to total 100 cc.

After regulating the pH of the above medium from 8.0 to 7.8, one hundred cubic centimeters of the above medium was introduced into a 500 cc. Erlenmeyer flask, and the flask contents were sterilized by heating at 115–130° C. for 10–30 minutes. Then Cellumonas sp. closely related to *galba* (A.T.C.C. No. 15526) previously cultured for 24 hours at 30° C. in the above media was introduced into the flask. Thereafter 0.35 gram of n-amylbenzene was added and fermentation was continued for an additional 96 hours under shaking at 30° C.

Approximately 96 hours after the addition of the n-amyl benzene, the fermentation was stopped and the reaction medium was analyzed for cinnamic acid, 5-phenyl valeric acid, and unconverted n-amyl benzene. These analyses revealed an essentially complete (100% of a weight basis) conversion of n-amyl benzene to cinnamic acid plus 5-phenyl valeric acid. The concentration of cinnamic acid present was 0.32 wt. percent (based on total fermentation media) for a selectivity of approximately 91 percent (molar basis). The concentration of 5-phenyl valeric acid present was 0.03 wt. percent for a selectivity of approximately 9 percent (molar basis).

*Example 2*

The procedure of Example 1 was repeated except that the second stage of fermentation was stopped 48 hours after the addition of n-amyl benzene. The selectivity to cinnamic acid was 98 percent (molar basis), and the selectivity to 5-phenyl valeric acid was 2 percent (molar basis). The conversion of n-amyl benzene to cinnamic acid plus 5-phenyl valeric acid was approximately 26% (weight basis).

*Example 3*

The procedure of Example 1 was repeated only using *Pseuodomonas ligustri* (A.T.C.C. No. 15522) as the microorganism in both phases of fermentation. The second stage of fermentation was conducted for 24 hours after the addition of n-amyl benzene, 0.18 gram per 100 cc. of culture media. At this time the fermentation media was harvested and analyzed. Ninety-seven wt. percent of the n-amyl benzene charged was consumed. The conversion of n-amyl benzene to cinnamic acid plus 5-phenyl valeric acid was approximately 60% (weight basis). The percent selectivity (molar basis) to cinnamic acid was 90 percent and to 5-phenyl valeric acid was 10 percent.

*Example 4*

The procedure of Example 1 was repeated, but using *Pseudomonas pseudomallei* (A.T.C.C. 15523) was the microorganism in both stages of fermentation. As in Example 3, 0.18 gram of n-amyl benzene per 100 cc. of fermentation media was employed, and the media was harvested 24 hours after addition of the n-amyl benzene. Analysis revealed that 72 wt. percent of the n-amyl benzene charged was consumed, 77% of this being converted to total organic acids (cinnamic acid plus 5-phenyl valeric acid). The selectivity to cinnamic acid (molar basis) was 91 percent.

*Examples 5 to 7*

The procedure of Example 1 was repeated only using 0.18 gram of n-amyl benzene per 100 cc. of culture media. These separately conducted fermentations were stopped 24 hours after addition of the n-amyl benzene. The microorganisms used were as follows:

Example: Microorganism
5 ---- *Pseudomonas orvilla* (A.T.C.C. No. 15524).
6 ---- *Alcaligenes sp.* (A.T.C.C. No. 15525).
7 ---- *Brevibacterium healii* (A.T.C.C. No. 15527).

The selectivity to cinnamic acid in each case was in excess of approximately 80 percent (molar basis).

*Example 8*

5-phenyl valeric acid is prepared selectively by the microorganism Alcaligenes sp. (A.T.C.C. No. 15525) using the growth medium of Example 1 and a 1 wt. percent concentration of n-amyl benzene, which is added 24 hours after the initial fermentation (as in Example 1). The average pH throughout fermentation is 6.5. The media is harvested approximately 12 hours after n-amyl benzene addition. The microorganism cell concentration at start-up ranges from 0.3 to 2.5 wt. percent. The conversion of n-amyl benzene to organic acids is 75% (weight basis) of which in excess of 80 percent is 5-phenyl valeric acid.

*Example 9*

Using *Cellumonas galba* (A.T.C.C. No. 15526) and the growth medium of Example 1, a 100 cc. continuous fermentation was conducted at 30° C. using a 24-hour induction period on n-hexadecane as in Example 1. The n-hexadecane feed level was 0.3 ml. at 8 hours, 1 ml. at 24 hours, 1 ml. at 48 hours and maintained at 1 ml. for the remainder of the continuous fermentation run. At 48 hours after start-up 65% (weight basis) of the n-hexadecane was being utilized.

The addition of n-amyl benzene (0.35 gram) began 24 hours after start-up, and the residual n-amyl benzene concentration was maintained at 0.2 ml. The fermentation was stopped at 120 hours after start-up (96 hours after beginning the addition of n-amyl benzene). The yield of cinnamic acid at this harvest period was 2.9 grams per liter.

*Example 10*

Fermentations were conducted using *Cellumonas galba* (A.T.C.C. No. 15526) for over-all time periods ranging from 48 hours to 120 hours using the varying initial inoculum concentrations (cells plus media from a previous fermentation), and time periods at which the n-amyl benzene was added as noted in the table which follows: The carbon source for microorganism growth was commercial n-hexadecane and the n-amyl benzene was 100% pure by mass spectrophotometric analysis. The growth medium used was as in Example 1, but with n-hexadecane concentrations ranging from 2.0 to 6.0 wt. percent as noted below. A growth temperature of 30° C. was maintained throughout fermentation. These fermentations were conducted in 500 ml. baffled shake flasks containing 100 ml. of growth medium plus inoculum. The shake speed was 300 revolutions per minute. The pertinent data are tabulated below.

TABLE

| Initial Inoculum (Weight Percent) | Initial Hexadecane Concentration (Weight Percent) | Amylbenzene Added | Cell Growth at Time of Amylbenzene Addition (grams/liter) | Total Ferment Time (Hours) | Cinnamic Acid Conc. at End of Fermentation (grams/liter) |
|---|---|---|---|---|---|
| 2.0 | 2.0 | At 24 Hrs | 0.8 | 48 | 0.2 |
| 4.0 | 3.0 | At 24 Hrs | 1.9 | 48 | 0.2 |
| 8.0 | 4.0 | At 24 Hrs | 2.6 | 48 | 0.5 |
| 2.0 | ¹ 4.0 | At 48 Hrs | 6.7 | 72 | 1.5 |
| 4.0 | 6.0 | At 48 Hrs | 8.2 | 72 | 1.0 |
| 8.0 | ² 6.0 | At 48 Hrs | 12.4 | 72 | 3.3 |
| 4.0 | 4.0 | At 48 Hrs | 8.2 | 96 | 5.0 |
| 8.0 | 4.0 | At 48 Hrs | 12.4 | 96 | 4.0 |
| 8.0 | ² 6.0 | At 48 Hrs | 12.4 | 120 | 5.0 |

¹ 2% added initially, 2% added at 24 hours.
² 2% added initially, 4% added at 24 hours.

*Example 11*

Comparable fermentations were conducted at 30° C. using a growth medium essentially as in Example 1 except with respect to the carbon feed source (as noted below in table). The microorganism employed was *Cellumonas galba* (A.T.C.C. No. 15526) and the fermentations were done using 100 ml. of fermentation media in 500 ml. shake flasks using shaking essentially as in Example 10.

Run 1 illustrates an attempt to produce cinnamic acid from n-hexadecane (a carbon growth source for said microorganism) alone, no odd alkyl moiety carbon numbered n-alkylated benzene being present. Run 2 constitutes an attempt to produce cinnamic acid from an odd alkyl moiety carbon numbered n-alkylated benzene alone without any previous induction on a carbon growth source. Run 3 illustrates the process of this invention, i.e. first growing the microorganism on the carbon growth source followed by introduction of the said n-alkylated benzene and continuing fermentation to harvest. The pertinent data are summarized in the table below. In Run 3 a 48-hour induction period on n-hexadecane was employed before feeding n-amyl benzene followed by a 96-hour second stage fermentation.

An interesting observation gleaned from this experiment is that although the microbes were able to utilize either amylbenzene (Run 2) or hexadecane (Run 1) alone to reproduce cells, cinnamic acid was produced selectively only when the microbes were first inducted (Run 3) on another carbon source. In Runs (1) and (2) essentially no cinnamic acid was produced.

TABLE

| Run No. | Carbon Substrate(s) and Concentration (grams/liter) | Substrate Conversion (Weight, percent) | Total Fermentation Time (Hours) | Major Product | Total Acid Concentration at Harvest (g./l.) | Selectivity to Cinnamic Acid (Percent on Molar Basis) |
|---|---|---|---|---|---|---|
| 1 | n-Hexadecane (1.0) | 100 | 72 | Microorganism cells | 0 | 0 |
| 2 | n-Amylbenzene (4.0) | 74 | 72 | do | 0.1 | ca. 0 |
| 3 | n-Hexadecane (1.0) then after 48 hours n-amylbenzene (3.5). | [1] 99 | 144 | Cinnamic acid | 3.5 | 100 |

[1] Conversion of n-amyl benzene.

While the above examples illustrate the present invention in great detail, it should be remembered that the present invention in its broadest aspects is not necessarily limited to the conditions employed in these examples.

What is claimed is:

1. A process for preparing cinnamic acid and 5-phenyl valeric acid from an odd alkyl moiety carbon numbered n-alkylated benzene which comprises first fermenting a microorganism selected from the group consisting of:

Pseudomonas ligustri (A.T.C.C. No. 15522)
   Pseudomonas pseudomallei (A.T.C.C. No. 15523)
   Pseudomonas orvilla (A.T.C.C. No. 15524)
   Alcaligenes sp. (A.T.C.C. No. 15525)
   Cellumonas galba (A.T.C.C. No. 15526) and
   Brevibacterium healii (A.T.C.C. No. 15527)

on a carbon feed source other than the n-alkylated benzene in a fermentation media comprising an aqueous growth medium containing oxygen and other essential nutrients, then feeding said n-alkylated benzene to said fermentation, continuing fermentation for a period in excess of 18 hours and harvesting 5-phenyl valeric acid within 18 hours after the addition of the n-alkylated benzene and harvesting cinnamic acid after that period.

2. A process as in claim 1 wherein the fermentation is conducted for a time period ranging from about 18 to about 56 hours before feeding said n-alkylated benzene thereto.

3. A process as in claim 1 wherein said n-alkylated benzene contains an odd number of carbon atoms ranging from 3 to 15.

4. A process as in claim 1 wherein said carbon source is an aliphatic hydrocarbon.

5. A process as in claim 1 wherein the entire fermentation is conducted at temperatures ranging from about 20 to 40° C.

6. A process as in claim 1 wherein the cell growth level of said microorganism before addition of said n-alkylated benzene ranges from about 0.6 to 20 grams per liter.

7. A process as in claim 1 wherein the concentration of said n-alkylated benzene ranges from about 0.1 to 25 grams per liter.

8. A process for preparing cinnamic acid selectively from an n-alkylated benzene containing an odd number of carbon atoms in its n-alkyl group which comprises contacting a microorganism selected from the group consisting of:

Pseudomonas ligustri (A.T.C.C. No. 15522)
   Pseudomonas pseudomallei (A.T.C.C. No. 15523)
   Pseudomonas orvilla (A.T.C.C. No. 15524)
   Alcaligenes sp. (A.T.C.C. No. 15525)
   Cellumonas galba (A.T.C.C. No. 15526) and
   Brevibacterium healii (A.T.C.C. No. 15527)

with an aliphatic hydrocarbon in a fermentation media comprising an aqueous growth medium containing oxygen and other essential cell nutrients for a time period ranging from about 18 to about 56 hours; then feeding said n-alkylated benzene thereto, continuing fermentation for a time period ranging from about 20 to about 144 hours and then harvesting cinnamic acid from the fermentation media.

9. A process as in claim 8 wherein said microorganism is Cellumonas galba (A.T.C.C. No. 15526)

10. A process as in claim 8 wherein the cell growth level of said microorganism before addition of said n-alkylated benzene ranges from about 3 to 15 grams per liter.

11. A process as in claim 8 wherein the concentration of said n-alkylated benzene ranges from about 2 to about 20 grams per liter.

12. A process as in claim 8 wherein the concentration of said aliphatic hydrocarbon ranges from about 1 to about 12 wt. percent 13. A process as in claim 8 wherein the fermentation is conducted at temperatures ranging from about 20 to 40° C.

14. A process as in claim 8 wherein said aliphatic hydrocarbon is a $C_1$-$C_{30}$ n-paraffin.

15. A process for preparing 5-phenyl valeric acid selectively from an n-alkylated benzene containing an odd number of carbon atoms in its n-alkyl group which comprises contacting the microorganism Alcaligenes sp. (A.T.C.C. No. 15525) with an aliphatic hydrocarbon in a fermentation media containing oxygen and other essential cell nutrients for a time period ranging from about 18 to about 56 hours, then feeding said n-alkylated benzene thereto while continuing fermentation and removing 5-phenyl valeric acid as formed.

References Cited by the Examiner
UNITED STATES PATENTS 3,057,784   10/1962   Davis et al. _____ 195—28

A. LOUIS MONACELL, *Primary Examiner.*

L. M. SHAPIRO, *Assistant Examiner.*